United States Patent [19]

Kadono et al.

[11] 4,191,217

[45] Mar. 4, 1980

[54] REINFORCING RUBBER HOSE

[75] Inventors: Mamoru Kadono; Tetsuji Saigusa; Yoshiyuki Nakajima; Tomohiro Koga, all of Yokohama, Japan

[73] Assignee: Bridgestone Tire Company, Limited, Tokyo, Japan

[21] Appl. No.: 966,991

[22] Filed: Dec. 6, 1978

[30] Foreign Application Priority Data

Dec. 6, 1977 [JP] Japan .................... 52-146356

[51] Int. Cl.$^2$ ............................................ F16L 11/12
[52] U.S. Cl. ............................ 138/109; 138/153
[58] Field of Search ............... 138/109, 153, 138, 126, 138/103, 137, 172

[56] References Cited

U.S. PATENT DOCUMENTS

| | | | |
|---|---|---|---|
| 3,596,681 | 8/1971 | Elson | 138/109 |
| 3,920,049 | 11/1975 | Lippert et al. | 138/126 |
| 4,132,382 | 1/1979 | Jackson | 138/138 |
| 4,154,266 | 5/1975 | Tanaka et al. | 138/109 |

Primary Examiner—Lenard A. Footland
Attorney, Agent, or Firm—Sughrue, Rothwell, Mion, Zinn and Macpeak

[57] ABSTRACT

A reinforced rubber hose mainly consisting of a hose body composed of inner and outer rubber layers and a reinforcing layer interposed therebetween and adapted to be secured or fastened at its two ends to a pair of cylindrical mouth pieces to be connected to the associated pipe ends. At least free end of the reinforcing layer is composed of inner and outer reinforcing layers. The inner reinforcing layer is wound around a clamping ring arranged at each end of the hose body from its inside toward the outside thereof to form a turn-back portion and the outer reinforcing layer is superimposed about and covering the turn-back portion of the inner reinforcing layer.

3 Claims, 5 Drawing Figures

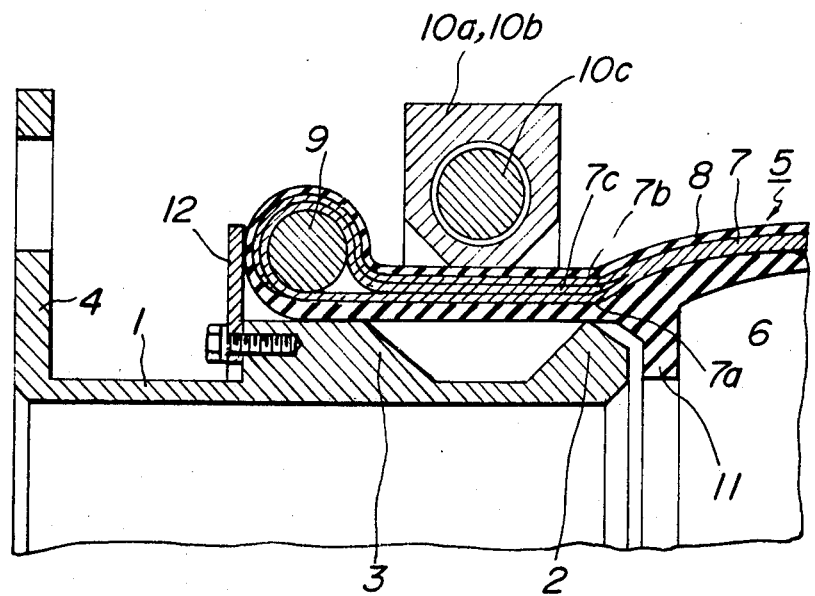
FIG._4a
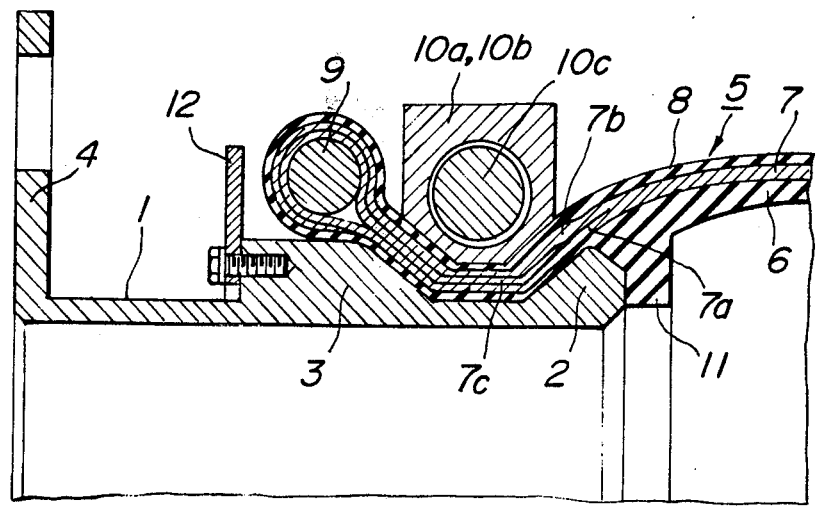
FIG._4b

REINFORCING RUBBER HOSE

BACKGROUND OF THE INVENTION

1. Field of the Invention

This invention relates to a reinforced rubber hose.

2. Description of the Prior Art

A reinforced rubber hose mainly consisting of a hose body composed of inner and outer rubber layers and a reinforcing layer interposed therebetween and adapted to be secured or fastened at its two ends to a pair of cylindrical mouth pieces to be connected to the associated pipe ends has heretofore been well known in the art. In such conventional reinforced rubber hose, the rubber hose is bonded with the cylindrical mouth piece by vulcanization, and as a result, the tension subjected to the reinforcing layer by the internal pressure in the hose tends to separate the rubber hose from the cylindrical mouth piece and hence slip out the former from the latter.

SUMMARY OF THE INVENTION

An object of the invention, therefore, is to provide a reinforced rubber hose which will overcome the above mentioned drawback.

A feature of the invention is the provision in a reinforced rubber hose comprising a pair of cylindrical mouth pieces each having an annular end rib, a hose body extending across these cylindrical mouth pieces and composed of inner and outer rubber layers and a reinforcing layer interposed between these rubber layers, and a clamping ring arranged at each end of the hose body and wound around by the free end of the reinforcing layer, the clamping ring urging the reinforcing layer against the annular end rib of the cylindrical mouth piece so as to make the hose body integral with the cylindrical mouth piece of the improvement wherein at least free end of said reinforcing layer is composed of inner and outer reinforcing layers, said inner reinforcing layer being wound around said clamping ring from its inside toward the outside thereof to form a turn-back portion and said outer reinforcing layer being superimposed about and covering said turn-back portion of said inner reinforcing layer.

Another feature of the invention is the provision in the above mentioned reinforced rubber hose of a clamping band interposed between said clamping ring and said end rib of said cylindrical mouth piece and firmly clamping said inner and outer reinforcing layers around said outer periphery of said cylindrical mouth piece.

The other objects, features and advantages of the invention will appear more clearly from the following specification in connection with the accompanying drawings, wherein:

BRIEF DESCRIPTION OF THE DRAWINGS

FIG. 4a is an enlarged longitudinal sectional view of the reinforced rubber hose shown in FIG. 3 with a hose body loosely mounted around a cylindrical mouth piece; and FIG. 4b is a similar enlarged longitudinal sectional view showing a hose body firmly fastened around a cylindrical mouth piece.

DETAILED DESCRIPTION OF THE PREFERRED EMBODIMENTS

Figure 1:
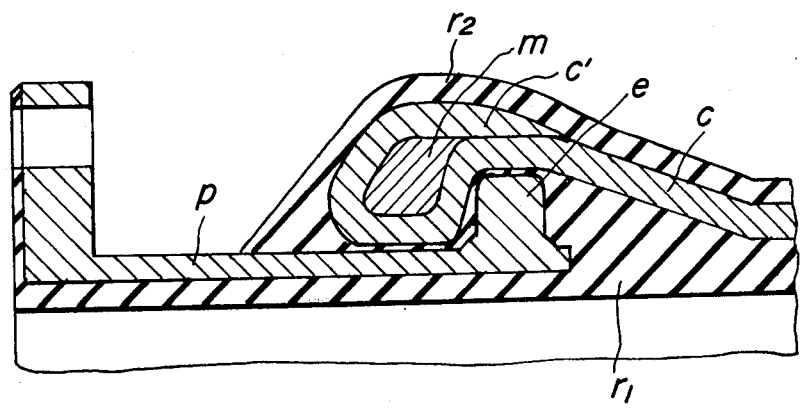
FIG. 1 is a longitudinal sectional view of a conventional reinforced rubber hose.

FIG. 1 shows a conventional reinforced rubber hose in section.

Referring to FIG. 1, a cylindrical mouth piece p is provided at its free end with an end rib e. A hose body is composed of an inner rubber $r_1$, a reinforcing layer c and an outer rubber $r_2$. The reinforcing layer c is formed of a canvas, tire cord or any other fibrous reinforcing material. The reinforcing layer c passes over the upper edge of the end rib e and is wound around a clamping ring m from its inside toward the outside thereof to form a turn-back portion c' which is covered with the outer rubber $r_2$. The hose body is vulcanized so as to make it integral with the cylindrical mouth piece p. The clamping ring m is formed of a plurality of wires twisted together.

In the conventional reinforced rubber hose constructed as above described, the clamping ring m functions to support the tension subjected to the reinforcing layer c. The reinforcing layer c passes over the upper edge of the end rib e and is bent downwardly and then wound around the clamping ring m and terminated at the turn-back portion c', and as a result, the tension subjected to the inner surface of the reinforcing layer c becomes unbalanced with the tension subjected to the outer surface thereof. That is, the burden carried by the strength of the loosened side of the reinforcing layer c is decreased, thereby rendering the strength efficiency low. Hence, there is a risk of the reinforcing layer c being broken at a position immediately beneath the clamping ring m and at that portion of the reinforcing layer c which makes frictional contact with the end rib e.

Figure 2:
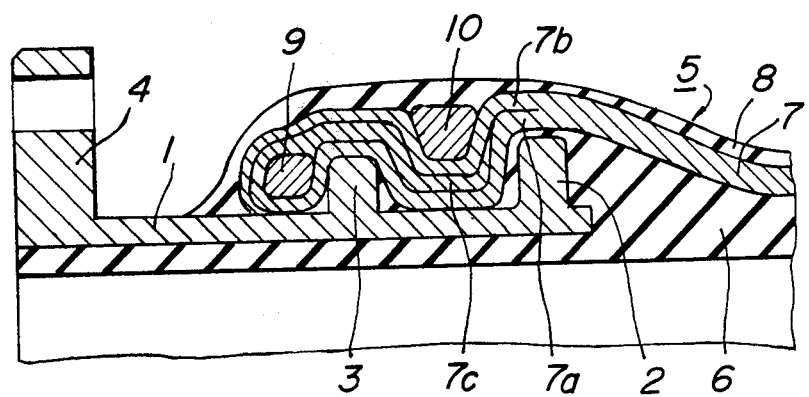
FIG. 2 is a longitudinal sectional view of one embodiment of a reinforced rubber hose according to the invention.

FIG. 2 shows one embodiment of a reinforced rubber hose according to the invention in section. In FIG. 2, reference numeral 1 designates a cylindrical mouth piece to be connected to a pipe line, 2 its end rib, 3 an intermediate rib, 4 a connection flange, and 5 a hose body. The hose body 5 is composed of an inner rubber 6, a reinforcing layer 7 and an outer rubber 8 in the same manner as in the case of the conventional reinforced rubber hose shown in FIG. 1.

In the present invention, the free end of the reinforcing layer 7 is divided into an inner reinforcing layer 7a and an outer reinforcing layer 7b. The inner reinforcing layer 7a is wound around a clamping ring 9 from its inside toward the outside thereof to form a turn-back portion 7c which is superimposed about the inner reinforcing layer 7a. The outer reinforcing layer 7b is superimposed about the turn-back portion 7c of the inner reinforcing layer 7a so as to cover that portion of the inner reinforcing layer 7a which is wound around the clamping ring 9 from its inside toward the outside thereof.

The reinforced rubber hose constructed as above described according to the invention renders it possible to make the total thickness of the free end of the reinforcing layer 7 smaller than that to be defined when the reinforcing layer 7 as a whole is wound around the clamping ring 9 as in the case of the conventional reinforced rubber hose shown in FIG. 1. In addition, the shearing resistances at both the inner and outer surfaces of the turn-back portion 7c are counter balanced with each other. In addition, the thickness of the inner reinforcing layer 7a is one-half smaller than that of the reinforcing layer 7, and as a result, the bent portions of the inner reinforcing layer 7a result in a small difference in length between the both inner and outer surfaces thereof. It is clear, therefore, that the strength efficiency is not lowered contrary to the case when the reinforcing layer 7 as a whole is wound around the clamping ring 9.

Alternatively, the inner and outer reinforcing layers 7a, 7b of the reinforcing layer 7 may be extended over the entire length of the hose body 5. Such modified construction can also obtain the same effect as in the case of the construction shown in FIG. 2.

In the embodiment shown in FIG. 2, provision is made of a clamping band 10 which can firmly secure those portions of the outer reinforcing layer 7b, turn-back portion 7c and inner reinforcing layer 7a which are interposed between the end rib 2 and the intermediate rib 3 to the inner surface of the cylindrical mouth piece 1. The hose body 5 constructed as above described is covered with the outer rubber 8 and the assembly is vulcanized in the usual manner so as to make the hose body 5 solidly integral with the cylindrical mouth piece 1. As a result, there is no risk of the hose body 5 being slipped out of the cylindrical mouth piece 1. If the intermediate rib 3 is not used, the clamping band 10 may be omitted.

Figure 3:
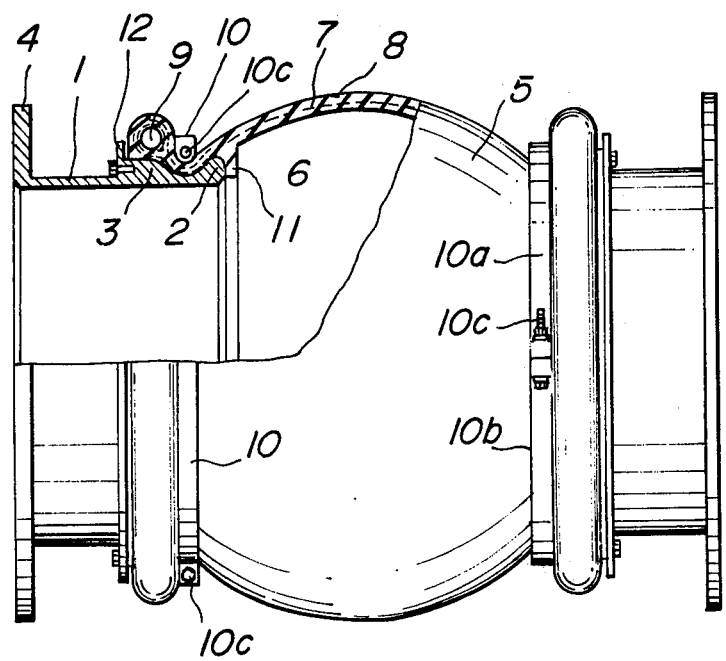
FIG. 3 is a front elevational view of another embodiment of a reinforced rubber hose according to the invention, partly shown in section.

FIG. 3 shows another embodiment of a reinforced rubber hose according to the invention. In the present embodiment, a hose body 5 is shaped beforehand independently of a cylindrical mouth piece 1 to which is secured the hose body 5 in a manner to be described with reference to FIGS. 4a and 4b.

As shown in FIG. 3, the hose body 5 is formed separately from the cylindrical mouth piece 1 and composed of an inner rubber 6, reinforcing layer 7 and outer rubber 8 in the same manner as the previous embodiment.

In the present embodiment, it is preferable that the inner rubber 6 is provided with a lip 11 adapted to be brought into contact with the end rib 2 of the cylindrical mouth piece 1. The inner rubber 6 has an inner contour corresponding to the outer contour of the cylindrical mouth piece 1 when the former is fitted over the latter. In this fitted over portion of the inner rubber 6, the reinforcing layer 7 is divided into an inner reinforcing layer 7a and an outer reinforcing layer 7b. Alternatively, the inner and outer reinforcing layers 7a, 7b of the reinforcing layer 7 may be extended over the entire length of the hose body 5.

In the present embodiment, the inner reinforcing layer 7a is wound around a clamping ring 9 from its inside toward the outside thereof to form a turn-back portion 7c. The clamping ring 9 is formed of a rigid material and has an inner diameter such that the inner rubber 6 closely fitted over the outer surface of an intermediate rib 3. About the turn-back portion 7c is superimposed the outer reinforcing layer 7b which is wound around the clamping ring 9 from its outside toward the inside thereof. The reinforcing layer 7 as a whole is covered with the outer rubber 8 and the assembly is vulcanized into one integral body to form a hose body 5.

In the case of fitting the hose body 5 to the cylindrical mouth piece 1, the clamping ring 9 is concentrically opposed to a stopper 12 secured to the intermediate rib 3 as shown in FIG. 4a. Then, a clamping band 10 is tightened to reduce the diameter of the free end of the hose body 5 as shown in FIG. 4b.

The clamping band 10 is composed of two halved rings 10a and 10b provided at their opposed ends with flanges each having a large thickness and urged against each other by tightening threaded bolts 10c. The clamping band 10 causes the free end of the hose body 5 to be uniformly tightened around the outer surface of the cylindrical mouth piece 1. In this case, the lip 11 of the inner rubber 6 is urged against the inner end of the end rib 2 of the cylindrical mouth piece 1 whereby the internal pressure to which the hose body 5 is subjected effectively functions to implement a self-sealing action of the reinforced rubber hose. In addition, it is possible to prevent the inner rubber 6 from being subjected to damage at the boundry between the cylindrical mouth piece 1 and the inner rubber 6 by sharp edges of foreign matter mixed in the fluid flowing therethrough.

As stated hereinbefore, the reinforced rubber hose according to the invention has the advantage that there is no risk of the hose body being slipped out of the two adjacent cylindrical mouth pieces, that the axial tension subjected to the reinforcing layer by the internal pressure in the hose body is positively supported by the shearing resistance between the inner and outer reinforcing layers at the inner and outer surfaces of the turn-back portion of the inner reinforcing layer, and as a result, the end rib 2 of the cylindrical mouth piece 1 functions to exhibit the self-sealing action of the reinforced rubber hose and hence there is no risk of leakage being involved at the fitting portion of the hose body to the cylindrical mouth piece, and that the shearing resistance doubled by the turn-back portions of the inner and outer reinforcing layers 7a, 7b can effectively prevent the separation failure of the reinforcing layer 7.

What is claimed is:

1. In an end structure for a reinforced rubber coupling hose comprising a pair of cylindrical mouth pieces each having an annular intermediate rib and an annular end rib, a hose body extending across these cylindrical mouth pieces and composed of inner and outer rubber layers, and a clamping ring arranged at each end of the hose body and wound around by the free end of the reinforcing layer, the clamping ring urging the reinforcing layer against the annular intermediate rib of the cylindrical mouth piece so as to make the hose body integral with the cylindrical mouth piece, the improvement wherein at least one free end of said reinforcing layer is composed of inner and outer reinforcing layers, said inner reinforcing layer being wound around said clamping ring from its inside toward the outside thereof to form a turn-back portion of said outer reinforcing layer being superimposed about and covering said turn-back portion of said inner reinforcing layer.

2. The reinforcing rubber hose coupling according to claim 1, further comprising a clamping band interposed between said clamping ring and said annular end rib of said cylindrical mouth piece and firmly clamping said inner and outer reinforcing layers around said outer periphery of said cylindrical mouth piece.

3. The reinforcing rubber hose coupling according to claim 1, wherein said inner and outer reinforcing layers extend over the entire length of said hose body.

* * * * *